US009810599B2

(12) United States Patent
Bright

(10) Patent No.: US 9,810,599 B2
(45) Date of Patent: Nov. 7, 2017

(54) WATER LEAK EARLY DETECTION SYSTEM AND METHOD

(71) Applicant: Eugene Bright, Boca Raton, FL (US)

(72) Inventor: Eugene Bright, Boca Raton, FL (US)

(*) Notice: Subject to any disclaimer, the term of this patent is extended or adjusted under 35 U.S.C. 154(b) by 0 days.

(21) Appl. No.: 14/281,486

(22) Filed: May 19, 2014

(65) Prior Publication Data

US 2014/0338428 A1 Nov. 20, 2014

Related U.S. Application Data

(60) Provisional application No. 61/824,574, filed on May 17, 2013.

(51) Int. Cl.
*G01M 3/32* (2006.01)
*G01M 3/00* (2006.01)

(52) U.S. Cl.
CPC .......... *G01M 3/3254* (2013.01); *G01M 3/002* (2013.01)

(58) Field of Classification Search
CPC ........ G01M 3/3254; G01M 3/32; G01M 3/26; G01F 23/00; A61H 2033/0054; E04H 4/12; E04H 4/1209; E04H 4/14; B65D 90/50
USPC ...... 73/40, 49.2, 290 R; 4/508, 507; 702/51; 137/393
See application file for complete search history.

(56) References Cited

U.S. PATENT DOCUMENTS

| 4,211,249 A | 7/1980 | Richards |
| 4,342,125 A | 8/1982 | Hodge |
| 5,616,239 A | 4/1997 | Wendell et al. |
| 5,730,861 A | 3/1998 | Sterghos et al. |
| 5,790,991 A | 8/1998 | Johnson |
| 5,878,447 A | 3/1999 | Mogab et al. |
| 5,996,138 A * | 12/1999 | Kentch ................. E04H 4/1209 210/167.12 |
| 6,532,814 B2 | 3/2003 | Bromley |
| 6,851,314 B2 | 2/2005 | Bromley |
| 7,395,559 B2 | 7/2008 | Gibson et al. |
| 8,209,794 B1 | 7/2012 | Harrison |

(Continued)

FOREIGN PATENT DOCUMENTS

WO    WO8504735    10/1985

OTHER PUBLICATIONS

Karanth, K. R., Ground Water Assessment Development and Management, 2008, 12th edition, p. 7.*

(Continued)

*Primary Examiner* — Daniel S Larkin
*Assistant Examiner* — Irving A Campbell
(74) *Attorney, Agent, or Firm* — The Concept Law Group, P.A.; Scott D. Smiley

(57) ABSTRACT

An early leak-detection warning system is disclosed, including an early leak-detection device having a processor operably configured to execute instructions for monitoring a reservoir for a potential undetected leak. The early leak-detection device determines a rate of water loss for the reservoir; determines an expected rate of water loss for the reservoir based on at least one predetermined factor; and compares the rate of water loss to the expected rate of water loss. In response to the rate of water loss exceeding the expected rate of water loss by a predetermined threshold, the system determines that there may be a leak associated with the reservoir.

21 Claims, 7 Drawing Sheets

(56) References Cited

U.S. PATENT DOCUMENTS

| | | | |
|---|---|---|---|
| 8,220,482 B1* | 7/2012 | DeVerse | E04H 4/12 |
| | | | 137/392 |
| 8,266,737 B1 | 9/2012 | Goettl | |
| 8,332,167 B2 | 12/2012 | Boa | |
| 8,345,924 B2 | 1/2013 | Wang et al. | |
| 2007/0251581 A1* | 11/2007 | Aughton | 137/391 |
| 2009/0107157 A1* | 4/2009 | Dube | 62/149 |
| 2011/0050395 A1* | 3/2011 | Ervin | 340/6.11 |
| 2012/0185184 A1* | 7/2012 | Armon | G01D 4/002 |
| | | | 702/51 |
| 2013/0036796 A1* | 2/2013 | Fleury, Jr. | G01M 3/00 |
| | | | 73/40.5 R |

OTHER PUBLICATIONS

Non-Patent Literature Measurement and Analysis of Evaporation From an Inactive Outdoor Swimming Pool, by Charles C. Smith, George Löf and Randy Jones, 1994, Elsevier Science Ltd, Solar Energy, vol. 53, vol. 1, No. 1, pp. 3-7.*

Non-Patent Literature (AWE) "Swimming Pool and Spa Introduction", archived on Apr. 21, 2012, accessed at http://web.archive.org/web/20120421024928/http://www.allianceforwaterefficiency.org/Swimming_Pool_and_Spa_Introduction.aspx.*

Non-Patent Literature (Ask) "Ask the Van—Illinois Department of Physics", archived on Mar. 3, 2010, accessed at http://web.archive.org/web/20100303053640/http://van.physics.illinois.edu/qa/listing.php?id=1440.*

Non-Patent Literature (Pool) "Pools, Spas, & Fountains".*

* cited by examiner

WATER LEAK EARLY DETECTION SYSTEM AND METHOD

CROSS-REFERENCE TO RELATED APPLICATION

This application claims priority to U.S. Provisional Patent Application No. 61/824,574 filed May 17, 2013, the entirety of which is incorporated by reference.

FIELD OF THE INVENTION

The present invention relates generally to a water leak early-detection system and method, and more particularly relates to a method and apparatus for continuously monitoring a reservoir for potential leaks, by calculating an expected rate of water loss and comparing the expected rate with a measured rate of water loss in order to determine the probability that a leak exists.

BACKGROUND OF THE INVENTION

Reservoirs, such as pools, spas, and fountains, require a substantial amount of fresh water to offset effects of evaporation, or loss of water into atmosphere. Average reservoir owners may be in danger of losing thousands of gallons of fresh water annually due to water leaks, or loss of water into the ground. Because it is so hard to distinguish between loss of water due to different factors and during different seasons, leaks in the pool can go undetected until they erode to the point where the owner notices significant deviations from normal operation. As any homeowner is aware, leaks that continue undetected for long periods of time will continue to worsen, and can cause significant damage to the structure itself, as well as surrounding structures. Additionally, leaks are an environmental waste of fresh water, which is particularly troublesome in areas experiencing drought and water supply shortages.

Present proposed solutions for reservoir leak detection requires the owner or operator of the reservoir to already suspect that the leak is occurring and concentrate on detecting actual leak location, rather than act as an overall early-warning leak detection system. Unfortunately, this does not provide a solution for water loss and damage occurring prior to suspecting a leak.

Therefore, a need exists to overcome the problems with the prior art as discussed above.

SUMMARY OF THE INVENTION

The invention provides a water leak early detection system and method that overcomes the hereinafore-mentioned disadvantages of the heretofore-known devices and methods of this general type.

With the foregoing and other objects in view, there is provided, in accordance with the invention, an early leak-detection warning system including an early leak-detection device including a processor operably configured to execute an executable instruction set for monitoring a reservoir for a potential undetected leak, the executable instruction set stored in a computer readable storage medium and the executable instruction set comprising instructions for: determining a rate of water loss for the reservoir; determining an expected rate of water loss for the reservoir based on at least one predetermined factor; comparing the rate of water loss to the expected rate of water loss; and in response to the rate of water loss exceeding the expected rate of water loss by a predetermined threshold, determining that there may be a leak associated with the reservoir.

In accordance with another feature, an embodiment of the present invention includes instructions for determining the rate of water loss by receiving information associated with how much water has been added to the reservoir over a time period.

In accordance with a further feature, the reservoir is at least one of: a pool, a spa, a pond, and a fountain.

In accordance with yet another feature, the at least one predetermined factor includes at least one of: an evaporation rate of the reservoir; a temperature associated with the reservoir; a humidity associated with the reservoir; a precipitation measurement associated with the reservoir; statistical information associated with water usage for an area; and statistical information associated with local weather and environmental conditions.

In accordance with another feature, the at least one predetermined factor includes at least one of: wind information associated with the reservoir; a temperature-sensitive material associated with the reservoir; a temperature-sensitive color associated with the reservoir; and a location of the reservoir relative to direct sunlight.

In accordance with a further feature, the system further includes a water flow measurement device: coupled to a fresh water source, communicatively coupled to the early leak-detection device, and operably configured to determine how much fresh water is added to the reservoir from the fresh water source; and the executable instruction set further comprises instructions for receiving information associated with how much fresh water is added from the water flow measurement device.

In accordance with a further feature, an embodiment of the present invention includes a remote server: communicatively coupled to a plurality of the early leak-detection devices within an area, operably configured to receive information associated with water usage from the plurality of early leak-detection devices within the area, communicatively coupled to a database for storing said received information from the plurality of early leak-detection devices within the area, and including an executable instruction set comprising instructions for calculating statistical information associated with water usage for the area using the stored information received from the plurality of early leak-detection devices.

In accordance with yet another feature, an embodiment of the present invention includes at least one of: a temperature sensor communicatively coupled to the early leak-detection device, the temperature sensor operably configured to measure a temperature and communicate information associated with the measured temperature to the early leak-detection device to calculate the rate of expected water loss for the reservoir; a precipitation sensor communicatively coupled to the early leak-detection device, the precipitation sensor operably configured to measure a precipitation and communicate information associated with the measured precipitation to the early leak-detection device to calculate the rate of expected water loss for the reservoir; and a wind sensor communicatively coupled to the early leak-detection device, the wind sensor operably configured to measure a wind speed and communicate information associated with the measured wind speed to the early leak-detection device to calculate the rate of expected water loss for the reservoir In accordance with another feature, an embodiment of the present invention includes a wireless network interface; the at least one predetermined factor includes statistical information associated with local weather and environmental conditions; and the executable instruction set further comprises instructions for receiving the statistical information via the wireless network interface.

In accordance with yet another feature, an embodiment of the present invention includes a wireless network interface communicatively coupled to the Internet; the at least one predetermined factor includes statistical information associated with local weather and environmental conditions; and the executable instruct set further comprises instructions for receiving the statistical information, via the wireless network interface, from a computer hosting an Internet website, the Internet website providing local weather and environmental information.

In accordance with the present invention, a method for monitoring a reservoir for a potential undetected leak includes detecting a rate of water loss for a reservoir; detecting an expected rate of water loss for the reservoir based on at least one predetermined factor; comparing the rate of water loss to the expected rate of water loss; and in response to the rate of water loss exceeding the expected rate of water loss by a predetermined threshold, detecting that there may be a leak associated with the reservoir.

In accordance with another feature of the present invention also includes determining the rate of water loss by determining how much water is added to the reservoir.

In accordance with another feature of the present invention includes providing a water flow measurement device: coupled to a fresh water source, and operably configured to determine how much fresh water is added to the reservoir from the fresh water source; and receiving information associated with how much fresh water is added from the water flow measurement device.

In accordance with yet another feature of the present invention includes receiving information associated with a probability there is a leak in the reservoir from a remote server, the remote server: communicatively coupled to a database for storing water usage information from an area, and including an executable instruction set comprising instructions for calculating statistical information associated with water usage for the area.

In accordance with another feature of the present invention includes receiving statistical information associated with local weather and environmental conditions via a wireless network interface to calculate the expected rate of water loss.

In accordance with a further feature of the present invention, an embodiment of the present invention includes receiving statistical information associated with local weather and environmental conditions via a wireless network interface from a computer hosting an Internet website, the Internet website providing local weather and environmental information.

In accordance with a further feature, an embodiment of the present invention includes an early leak-detection warning system, the system including a water flow measurement device coupled to a fresh water source. The water flow measurement device includes a water flow sensor operably configured to measure water flow from the fresh water source to a reservoir; an early leak-detection device including a processor operably configured to execute an executable instruction set for monitoring the reservoir for a potential undetected leak. The executable instruction set is stored in a computer readable storage medium and the executable instruction set includes instructions for: receiving information associated with a rate of water loss for the reservoir from the water flow measurement device; calculating an expected rate of water loss for the reservoir based on at least one predetermined factor; comparing the rate of water loss to the expected rate of water loss; and in response to the rate of water loss exceeding the expected rate of water loss by a predetermined threshold, determining that there may be a leak associated with the reservoir. The system includes at least one sensor communicatively coupled to the early leak-detection device, the at least one sensor operable to detect at least one of: an evaporation rate of the reservoir; a temperature associated with the reservoir; a humidity associated with the reservoir; and a precipitation amount associated with the reservoir.

Although the invention is illustrated and described herein as embodied in a water leak early detection system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a water surface of water within a water reservoir. The terms "program," "software application," and the like as used herein, are defined as a sequence of instructions designed for execution on a computer system. A "program," "computer program," "programming instructions," "executable instruction set," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
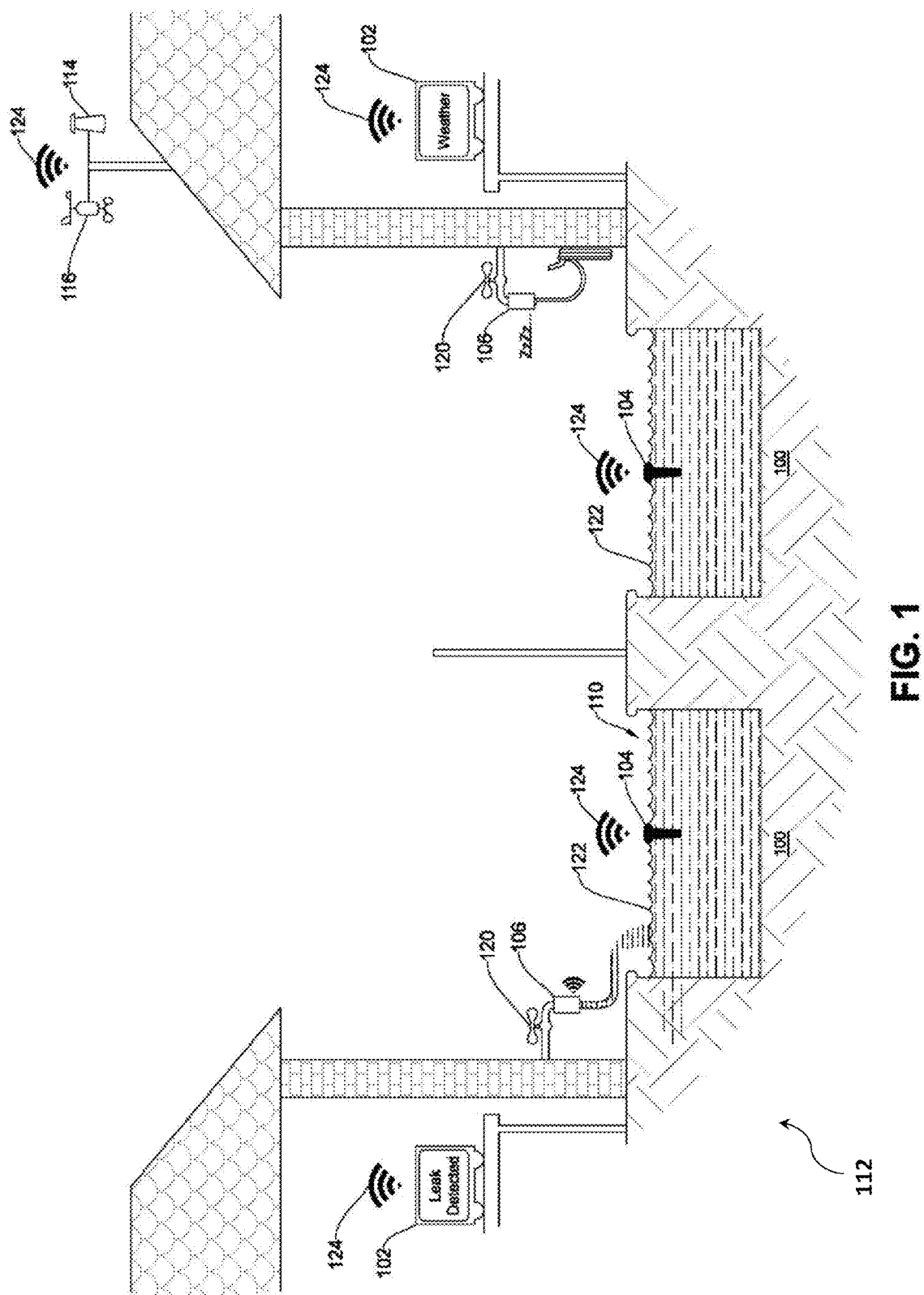
FIG. 1 is a schematic diagram of an exemplary implementation of an early leak-detection warning system in accordance with the present invention utilized in reservoir environment, and another early leak-detection warning system in accordance with the present invention utilized in a neighboring reservoir environment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient apparatus, system, and method for continuously monitoring for potential water-leaks associated with a reservoir. Embodiments of the invention provide a method for measuring a rate of water loss for the reservoir, calculating an expected rate of water loss using one or more sensors and/or statistical information, and determining whether there is a potential leak by comparing the measured rate of water loss to the calculated, expected rate of water loss. In addition, embodiments of the invention provide for a method of communicating the potential leak situation to a reservoir owner or operator.

Referring now to FIG. 1, one embodiment of the present invention is shown in a schematic view. FIG. 1 shows several advantageous features of the present invention, but, as will be described below, the invention can be provided in several shapes, sizes, combinations of features and components, and varying numbers and functions of the components. The first example of an early leak-detection warning system 100, as shown in FIG. 1, includes an early leak-detection device 102, a water station 104, and a water flow measurement device 106.

Figure 6:
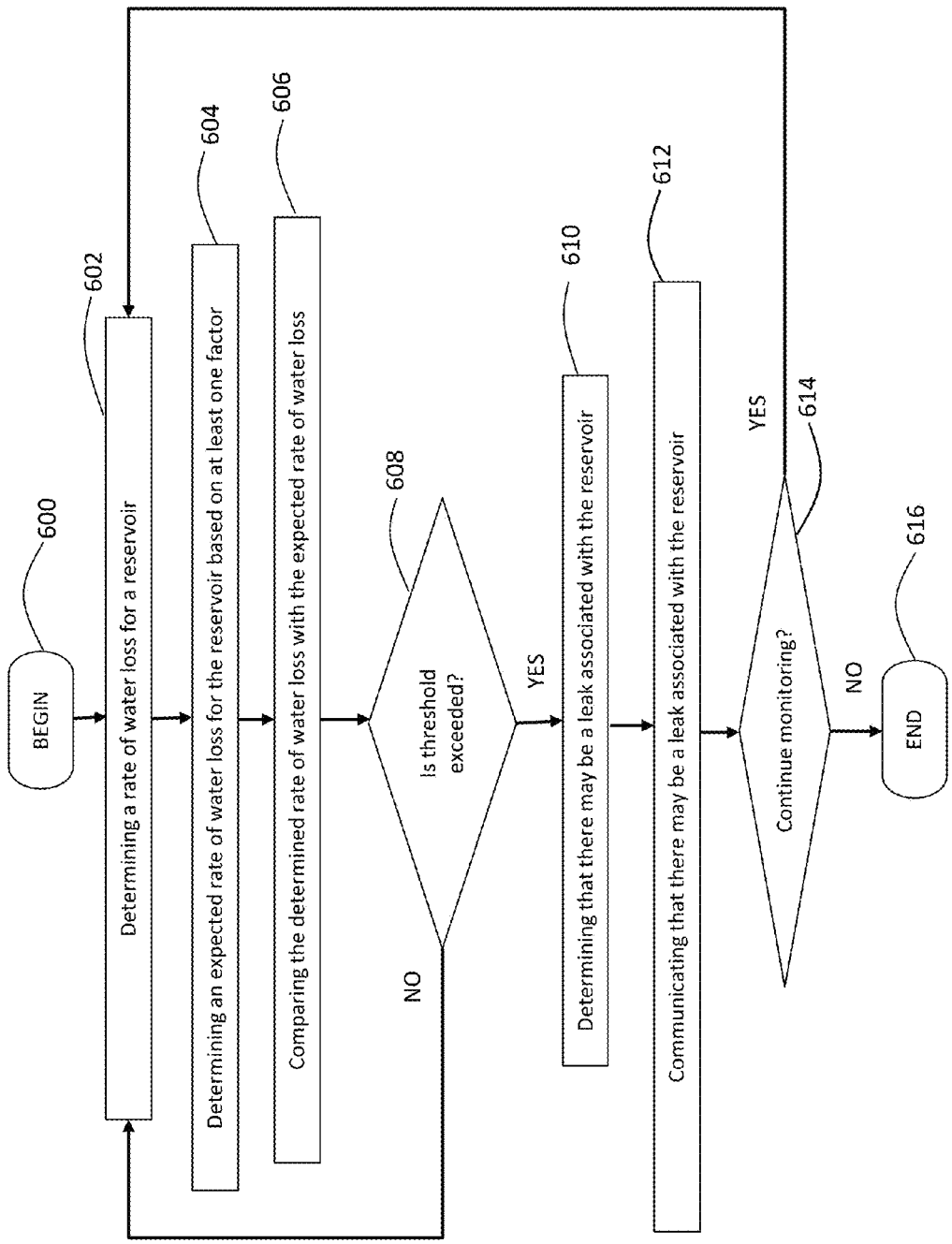
FIG. 6 is a process flow chart representing an exemplary method of monitoring for a water-leak in accordance with the present invention.

FIG. 1 will be described in conjunction with the process flow chart of FIG. 6. The process of FIG. 6 begins at step 600 and moves directly to step 602, where the early leak-detection device 102 determines a rate of water loss for the reservoir 110.

The early leak-detection device 102 can be an electronic device having a processor. The processor can be operably configured to execute an executable instruction set for monitoring a reservoir 110 for a potential undetected leak 112. The executable instruction set can be stored in a computer readable storage medium. The executable instruction set can include instructions for carrying out the various methods and processes described herein. Although the various methods and processes described herein may be described as being performed by either of the leak-detection warning system 100, the water station 104, the water flow measurement device 106, or other components it is understood that the invention is not limited to performance by any one component.

The early leak-detection device 102 can determine the rate of water loss by receiving information associated with how much water has been added to the reservoir 110 over a time period. The information can be water flow measurements from the water flow measurement device 106. The water flow measurement device 106 can be coupled to a fresh water source 120, such as a water outlet coupled to a structure associated with and proximate to the reservoir 110. In other embodiments, the measurement device 106 can be fluidly coupled with any water source. The water flow measurement device 106 is operably configured to detect a rate of water flow from the fresh water source 120 into the reservoir 110, i.e., the amount of water added to the reservoir 110. The water flow measurement device 106 can be communicatively coupled to the early leak-detection device 102 for communication information associated with how much fresh water is added to the early leak-detection device 102. As used herein, the term "water flow measurement device" is intended to indicate any component operable to detect a rate of water flow for determining how much water is input into the reservoir 110. In one embodiment, the water flow measurement device 106 can be considered a water-loss detection device, the water-loss detection device operable to determine the rate of water loss for the reservoir 110. In some embodiments, the early leak-detection device 102 and the water-loss detection device are incorporated into the same structure. In alternative embodiments, the early leak-detection device 102 and the water-loss detection device are structurally separate and independent of one another.

In one embodiment, the rate of water loss for the reservoir 110 is proportional to the amount of water added to the reservoir 110. In another embodiment, the early leak-detection device 102 includes the water flow measurement device 106, or another water flow sensing device, such that it may detect how much water is added to the reservoir 110, internally, as opposed to receiving water flow measurements from an external component. In an alternative embodiment, the early leak-detection device 102 receives information associated with how much fresh water is added to the reservoir 110 from a water level sensor disposed within the reservoir 110. In other embodiments, the early leak-detection device 102 can receive such information from a water-level maintenance system. In further embodiments, the early leak-detection device 102 can receive such information through a user-input from a user-input interface communicatively coupled to the processor of the early leak-detection device 102. The user-input interface can be a touchscreen display, a keypad, a keyboard, a mouse, a dial, or any other use-input interface operable to receive input from a user.

In step 604, the early leak-detection device 102 determines an expected rate of water loss for the reservoir 110 based on at least one predetermined factor. The at least one predetermined factor can be an environmental factor. As used herein, the term "environmental factor" is intended to indicate any factor relating to or arising from the surrounds of the reservoir 110. In one embodiment, the early leak-detection device 102 calculates the expected rate of water loss based on at least one predetermined factor that is received from one or more external sensors and statistical information sources. In one embodiment, the sensor can be a temperature sensor operably configured to measure a temperature of water within the reservoir 110, near a top surface of the reservoir 110. The temperature sensor can be communicatively coupled to the processor of the early leak-detection device 102 and be operably configured to communicate information associated with the measured temperature to the processor to calculate the rate of expected water loss for the reservoir 110. In another embodiment, the sensor can be a temperature sensor operably configured to detect a temperature of air substantially proximate the top surface of water within the reservoir 110. Temperature associated with the water in the reservoir 110 and air proximate the top surface of water in the reservoir 110 will affect evaporation rates of water within the reservoir 110. Accordingly, predetermined factors used to determine and calculate the expected rate of water loss is an evaporate rate and a temperature associated with the reservoir 110.

In further embodiments, one of the predetermined factors can include user-input information regarding whether the reservoir 110 is comprised of a temperature-sensitive material and whether the reservoir 110 includes a temperature-sensitive color, such as including a black bottom pool, which will tend to absorb more sunlight than other colors. In yet another embodiment, one of the predetermined factors can be a location of the reservoir 110 relative to direct sunlight. For example, the user can indicate via the user-input interface, whether the reservoir 110 is, for example, an indoor pool, with or without a sunroof, or whether the reservoir 110 is an outdoor reservoir 110, which receives a substantial amount of direct sunlight, affecting temperature and, therefore, evaporation rates.

In yet another embodiment, the predetermined factor can be a humidity associated with the reservoir 110. The water station 104 can include a humidity sensor operably configured to measure a humidity of air proximate the top surface of water within the reservoir 110. In one embodiment, the water station 104 is disposed within the reservoir 110 and includes the temperature sensor for detecting the temperature of water and air proximate the water surface area 122. In one embodiment, the reservoir 110 is a swimming pool. In other embodiments, the reservoir 110 is a spa, a pond, or a fountain. The term "reservoir" is intended to indicate any container where fluid collects.

In another embodiment, the user can input information associated with the top surface area 122 of the water within the reservoir 110 for more accurately calculating the expected evaporation rate. The user can input the physical dimensions of the reservoir. In another embodiment, the user can add a measured amount of water to the reservoir 110 and determine how much the water level rose as a result of adding the measured amount of water. This information can be input into the early leak-detection device 102 via the user-interface and the early leak-detection device 102 can calculate the surface area 122 of the reservoir 110.

In yet another embodiment, the predetermined factor can be a precipitation measurement and the sensor can be a precipitation sensor 114 communicatively coupled to the processor of the early leak-detection device 102. The precipitation sensor 114 can be operably configured to measure a precipitation at the reservoir 110 and communicate information associated with the measured precipitation to the processor to calculate the rate of expected water loss for the reservoir 110. Precipitation is a natural source of water, which may add water to the reservoir 110, if the reservoir is located outdoors. The early leak-detection device 102 can use precipitation measurements to offset the expected water loss of the reservoir 110.

In a further embodiment, the predetermined factor can be wind information associated with the reservoir 110 and the sensor can be a wind sensor 116 communicatively coupled to the processor of the early leak-detection device 102. The wind sensor 116 can be operably configured to measure a wind speed and communicate information associated with the measured wind speed to the processor to calculate the rate of expected water loss for the reservoir 110. In yet another embodiment, the predetermined factor can be statistical information associated with local weather and environmental conditions.

The early leak-detection device 102 can be operably configured to receive local weather-related statistical information from national or local databases accessible a wide-area network, a local-area network, or the like, via the Internet. The early leak-detection warning system 100 can further include a network interface. The network interface can be included within the early leak-detection device 102. The network interface can facilitate communication between components of the system 100 via wires of a wired, or wireless signals 124 within a wireless network. In one embodiment, the early leak-detection device 102 can be operably configured to receive statistical information, via a wireless network interface, from a computer hosting an Internet website, the Internet website providing local weather and environmental information.

In one embodiment, the above-described sensors can be included in the early leak-detection device 102. In alternative embodiments, the above-described sensors can be external to the early leak-detection device 102, requiring a wired or wireless connection with the device 102 for communicating information therebetween. For example, one or more of the above-described sensors can be included in the water station 104. In another embodiment, one or more of the above-described sensors can be coupled to the structure proximate the reservoir 110. As illustrated in FIG. 1, the precipitation sensor 114 and the wind sensor 116 can be disposed on a roof of the structure.

In step 606, the early leak-detection device 102 compares the determined rate of water loss to the expected rate of water loss. The comparison can be a determination of the difference or ratio between the determined rate of water loss with the expected rate of water loss. In step 608, the early leak-detection device 102 can query whether the determined rate of water loss exceeds the expected rate of water loss by a predetermined threshold. The predetermined threshold is stored in non-volatile memory of the early leak-detection device 102 for access to the threshold value whenever a comparison is desired to be performed. In one embodiment, the predetermined threshold is a value input by the user via the user-input interface. In another embodiment, the predetermined threshold is a default value stored in memory. The default value can represent a substantial deviation from an average expected rate of water loss according to average national or location temperatures associated with seasonal use of the reservoir 110 or other pertinent factors. The predetermined threshold can be an amount calculated by the early leak-detection device 102 according to various physical and environmental factors input by the user and detected by sensors coupled to the early leak-detection device 102.

In step 610, in response to the rate of determined water loss exceeding the expected rate of water loss by the predetermined threshold, the early leak-detection device 102 can determine that there may be a leak associated with the reservoir 110. The early leak-detection device 102 may assign a percentage value associated with how much the detected water loss rate exceeds the expected water loss rate. This percentage value can be communicated to the reservoir owner or operator as an indication of the likelihood that a leak may exist. The predetermined threshold can include a plurality of threshold values, where if an initial minimum threshold value is met, a determination that a leak may exist is made, and where increasing threshold values are met, an increasing likelihood of a leak is communicated to the reservoir owner or operator. For example, a first threshold may be 5% and a second threshold may be 10%. Accordingly, where the rate of determined water loss exceeds the expected rate of water loss by 5%, an initial warning is communicated to the reservoir owner or operator that there may be a leak. When the rate of determined water loss exceeds the expected rate of water loss by 10%, a stronger warning is communicated to the reservoir owner or operator that there is a high likelihood of a leak.

In step 612, the early leak-detection device 102 communicates that there may be a leak associated with the reservoir 110 to the reservoir owner or operator. In one embodiment, the device 102 can provide an audio signal indicating a potential leak condition. In another embodiment, the device 102 can provide a visual indicator, such as a flashing light and a message on a display coupled to the device 102. In yet another embodiment, the device 102 can communicate to another electronic device associated with the reservoir owner or operator. The communication can include a message indicating that a potential leak has been detected. In further embodiments, the message, visual indication, or audio signal can be tailored to provide increasing urgency as the likelihood of a leak increases. For example, the message can indicate a percentage associated with the likelihood or include increasingly stronger language. The audio signal can increase in volume and frequency as the likelihood increases. The flashing light can change colors according to the likelihood of a leak.

In step 614, the process queries whether the early leak-detection warning system 100 should continue to monitor for potential leaks. If the answer is yes, the process continues to step 602, and the cycle repeats. If the answer is no, the process ends at step 616. In a preferred embodiment, the early leak-detection warning system 100 continuously monitors for potential leaks to protect against water damage and water waste.

Figure 2:
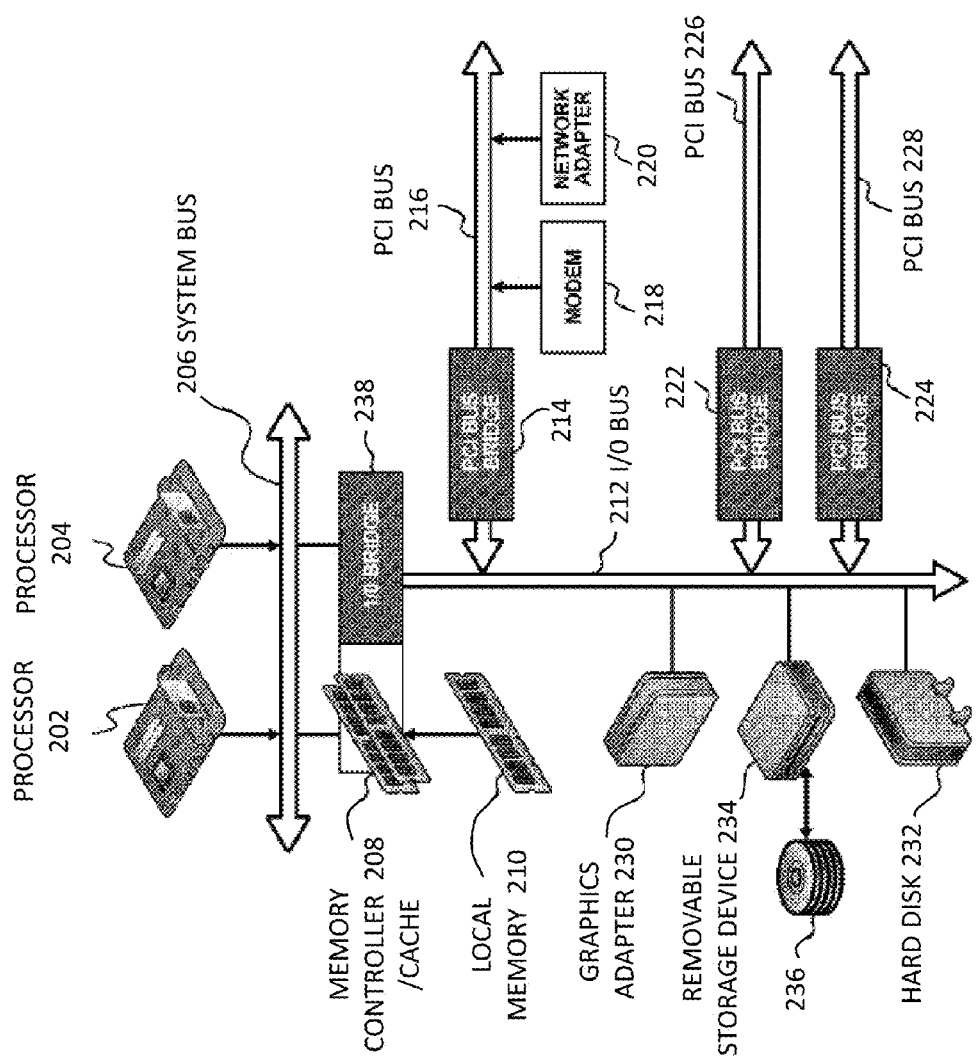
FIG. 2 is a schematic diagram of a data processing system that may be operably configured to implement a method of monitoring a low water volume of a water circulation system in accordance with the present invention.

Referring now primarily to FIG. 2, a block diagram of a data processing system 200 that may be used to implement processes and methods described herein, in accordance with embodiments of the present invention, is presented. The data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 210. An I/O bus bridge 238 is connected to system bus 206 and provides an interface to I/O bus 212. The memory controller/cache 208 and I/O bus bridge 238 may be integrated as depicted. The processor 202 or 204 in conjunction with memory controller 208 controls what data is stored in memory 210. The processor 202 and/or 204 and memory controller 208 can serve as a data counter for counting the rate of data flow to the memory 210 or from the memory 210 and can also count the total volume of data accessed to or from the memory 210. The processor 202 or 204 can also work in conjunction with any other memory device or storage location.

Peripheral component interconnect (PCI) bus bridge 214 connected to I/O bus 212 provides an interface to PCI local bus 216. A number of modems 218, or wireless cards, may be connected to PCI bus 216. Typical PCI bus implementations will support four PCI expansion slots or add-in connectors. PCI includes, but is not necessarily limited to, PCI-X and PCI Express components. Communications links between components of the water leak-detection warning system 100 in FIG. 1 may be provided through the modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, the data processing system 200 allows connections to a multiple network of computers. A graphics adapter 230 and hard disk 220 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
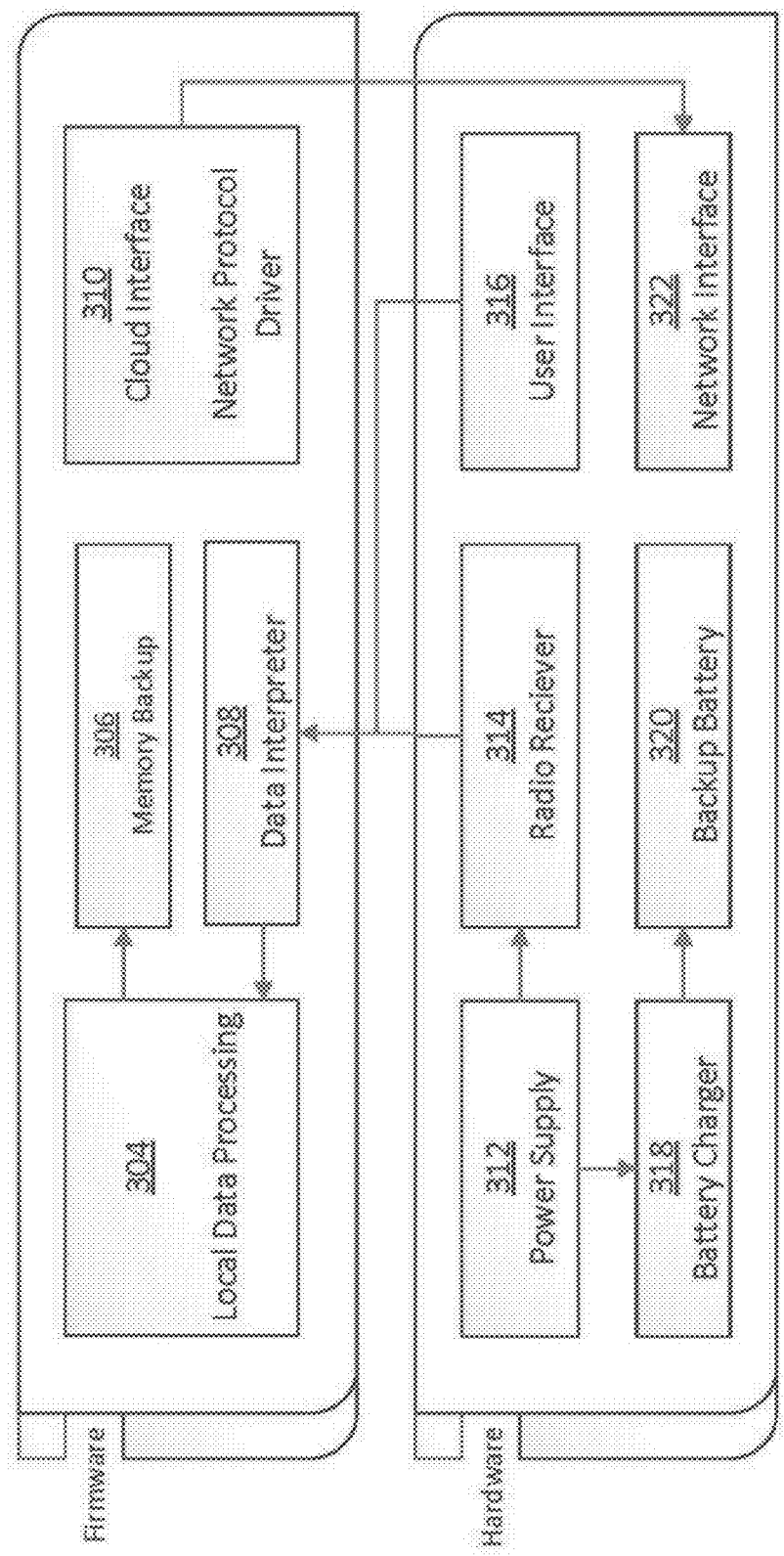
FIG. 3 is a block diagram of an exemplary implementation of a water-leak early-detection receiver in accordance with the present invention.
Figure 4:
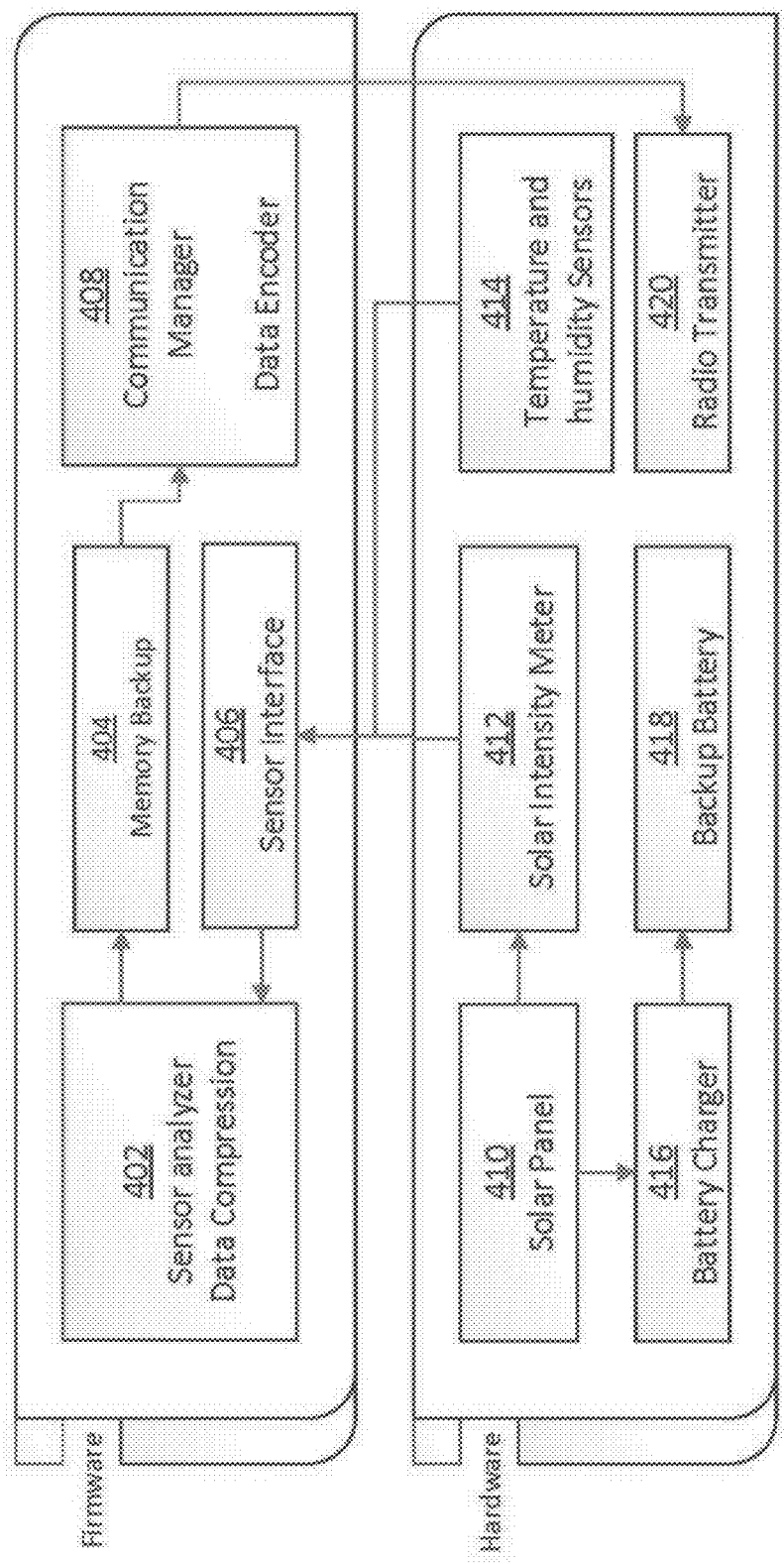
FIG. 4 is a block diagram of an exemplary implementation of a water station in accordance with the present invention.
Figure 5:
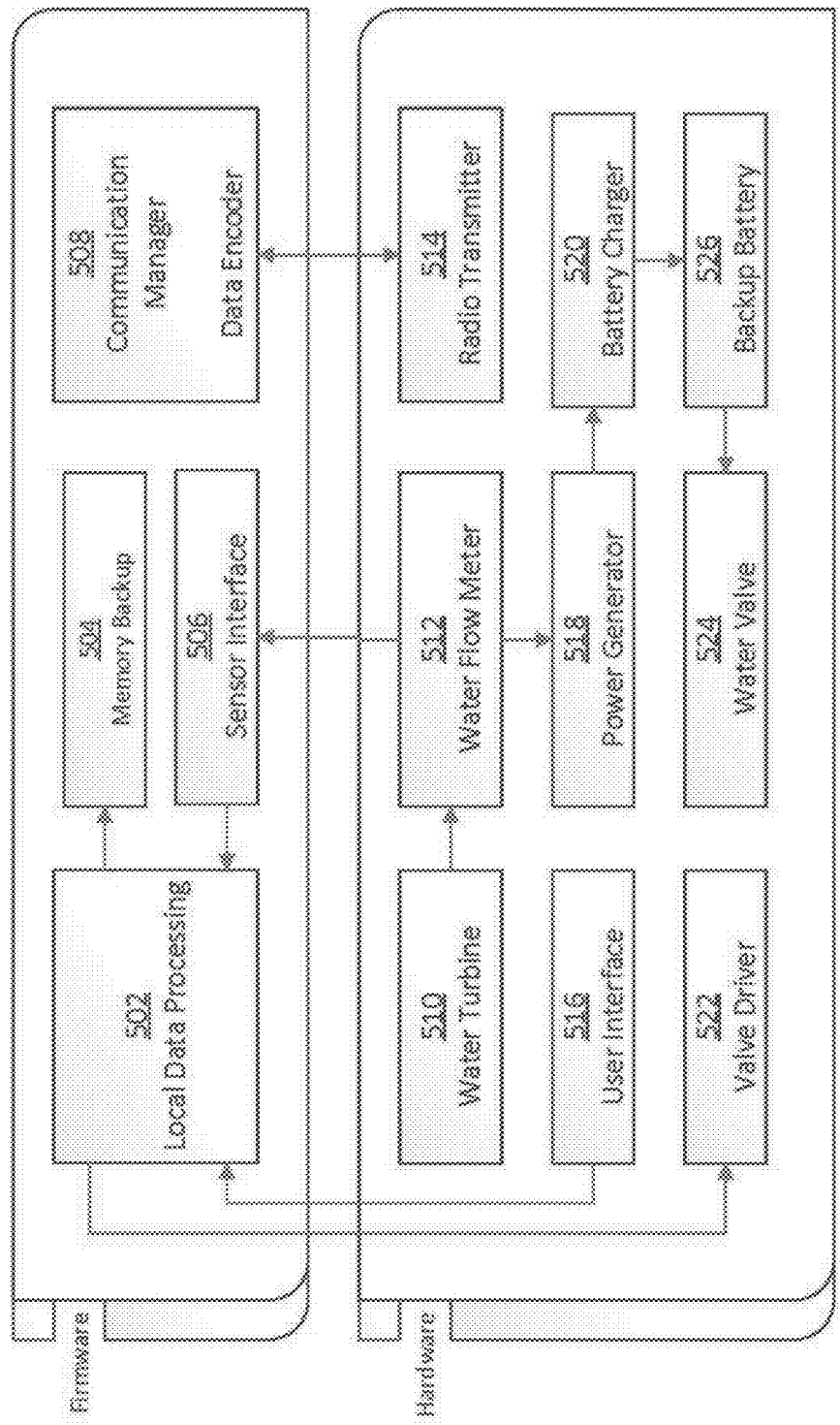
FIG. 5 is a block diagram of an exemplary implementation of a water-leak meter in accordance with the present invention.

FIGS. 3-5 illustrate exemplary embodiments of components of the early leak-detection warning system 100 that may implement methods and processes described herein. It is understood that the present invention is not limited to any one component executing any particular method or process steps. Additionally, although the description and/or figures may indicate functionality being executed by firmware or hardware, it is understood that the present invention is not intended to be limited in such manner.

Referring now primarily to FIG. 3, an exemplary embodiment of the early leak-detection device 102 is illustrated. The early leak-detection device 102 includes a local data processing feature 304, a memory backup 306, a data interpreter 308, and a network protocol driver 310, shown implemented as firmware. The early leak-detection device 102 further includes a power supply 312, a radio receiver 314, a user interface 316, a battery charger 318, a backup battery 320, and a network interface 322, shown implemented as hardware components.

The local data processing feature 304 monitors local data, such as information received from external sensors and servers communicatively coupled to the early leak-detection device 102, and processes said local data. The memory backup 306 can be provided to store information and data in non-volatile memory for later use. In one embodiment, the memory backup 306 can store information and data when the server communicatively coupled to the early leak-detection device 102 is unavailable to receive sensor information or other data. In another embodiment, the server can be a cloud, where software applications and information within a database are stored through a distributed network, such as the Internet, as opposed to on a dedicated hard drive. The network protocol driver 310 facilitates communication between the remote server, allowing sensor information and other data to be communicated to the server and allowing the early leak-detection device 102 to receive information associated with a potential leak. The data interpreter 308 receives sensor information for processing. In one embodiment, the data interpreter 308 receives sensor information from remotely located sensors via wireless radio waves 124, as illustrated in FIG. 1. The wireless radio waves 124 are received through the radio receiver 314. The power supply 312 provides power to the early leak-detection device 102. The backup battery 320 provides a backup power supply to the early leak-detection device 102 and the battery charger 318 facilitates charging of the backup battery 320. The user-interface 316 allows the reservoir owner or operator to input various operational parameters and view leak-detection status. In alternative embodiments, the user-interface 316 can be a touchscreen display, a keypad, a keyboard, a mouse, a dial, or any other use-input interface operable to receive input from the user. The network interface 322 can be, for example, a network interface card that allows for communication between the early leak-detection device 102 and the server, via a network. In one embodiment, the network interface 322 is operable to facilitate communication over a wireless network, such as the Internet or a cellular network. In another embodiment, the network interface 322 is operable to facilitate communication over a wired network via, for example, an Ethernet connection.

Referring now primarily to FIG. 4, an exemplary embodiment of the water station 104 is illustrated. The water station 104 includes a sensor analyzer 402, a memory backup 404, a sensor interface 406, and a communication manager 408, shown implemented as firmware. The water station 104 further includes a solar panel 410, a solar intensity meter 412, at least one sensor 414, a battery charger 416, a backup battery 418, and a radio transmitter 420, shown implemented as hardware components.

The sensor analyzer 402 receives and processes information received from the at least one sensor 414. The memory backup 404 can be provided to store information and data in non-volatile memory for later use. In one embodiment, the memory backup 404 can store information and data when the radio communication link is unavailable for transmitting sensor information to the early leak-detection device 102. The sensor interface 406 converts analog information received from the at least one sensor 414 into digital information that can be processed by the sensor analyzer 402. The communications manager 408 prepares sensor information to be communicated to the early leak-detection device 102. In one embodiment, the communications manager 408 encodes sensor information and includes said information into a communications data packet to be transmitted to the radio receiver 314 of the early leak-detection device 102, via the radio transmitter 420.

In one embodiment, the solar panel 410 is provided as a power source for the water station 104. The solar panel 410 is operable to receive sunlight and convert the sunlight into usable energy. The solar intensity meter 412 monitors output from the solar panel 410 to determine the solar intensity of sunlight proximate the water surface area 122. This information can be used to determine the expected rate of water loss for the reservoir 110. In one embodiment, the at least one sensor 414 is a temperature sensor operable to determine a temperature of the water and air proximate the water surface area 122. In a further embodiment, the at least one sensor 414 is a humidity sensor operable to determine a humidity proximate the water surface area 122. This information can be used to determine the expected rate of water loss for the reservoir 110. The backup battery 418 provides a backup power supply to the water station 104 and the battery charger 416 facilitates charging of the backup battery 418. In a preferred embodiment, the water station 104 is disposed within the reservoir 110, while the early leak-detection device 102 is disposed within the building, such as the user's home. Advantageously, this allows the user to view system status, including a potential leak status, without having to be at the reservoir area.

Referring now primarily to FIG. 5, an exemplary embodiment of the water flow measurement device 106 is illustrated. The water flow measurement device 106 includes a local data processing feature 502 a memory backup 504, a sensor interface 506, and a communication manager 508, shown implemented as firmware. The water flow measurement device 106 further includes a water turbine 510, a water flow meter 512, a radio transmitter 514, a user interface 516, a power generator 518, a battery charger 520, a water valve driver 522, a water valve 524, and a battery backup 526, shown implemented as hardware components.

The local data processing feature 502 receives water flow measurement information from the water flow meter 512 and processes the information to determine how much water was added to the reservoir 110. The memory backup 504 can be provided to store information and data in non-volatile memory for later use. In one embodiment, the memory backup 504 can store information and data when the radio communication link is unavailable for transmitting sensor information to the early leak-detection device 102. The sensor interface 506 receives water flow measurements from the water flow meter 512. The communication manager 508 prepares sensor information to be communicated to the early leak-detection device 102. In one embodiment, the communications manager 408 encodes the water measurement information and includes said information into a communications data packet to be transmitted to the radio receiver 314 of the early leak-detection device 102, via the radio transmitter 514.

The water turbine 510 is operable to discharge water at a flow rate, which can be used for determining how much water is added to the reservoir 110 from the fresh water source 120. The water flow meter 512 is a water flow sensor operably configured to measure a rotational speed of the turbine 510 for determining how much water is added to the reservoir 110 from the fresh water source 120. The user interface 516 is operably configured to allow the reservoir owner or operator to input various operational parameters. In one embodiment, the user interface 516 is operably configured to allow the reservoir owner or operator to input a value representing a specific amount of water to be added into the reservoir 110. This can be provided to assist the user with determining the water surface area 122 of the reservoir 110 for calculating the expected evaporation rate. In alternative embodiments, the user-interface 316 can be a touchscreen display, a keypad, a keyboard, a mouse, a dial, or any other use-input interface operable to receive input from the user. In a further embodiment, the power generator 518 is operable to convert energy from the water flow into usable power for the water flow measurement device 106. The battery backup 526 provides a backup power supply to the water flow measurement device 106, even when water is now flowing, and the battery charger 520 facilitates charging of the battery backup 526. The water valve driver 522 includes circuitry configured to operate the water valve 524 for releasing and stopping water flow from the fresh water source 120 into the reservoir 110, whereby a releasing and a stopping water flow from the fresh water 120 into the reservoir 110 may be considered an individual refill session.

Figure 7:
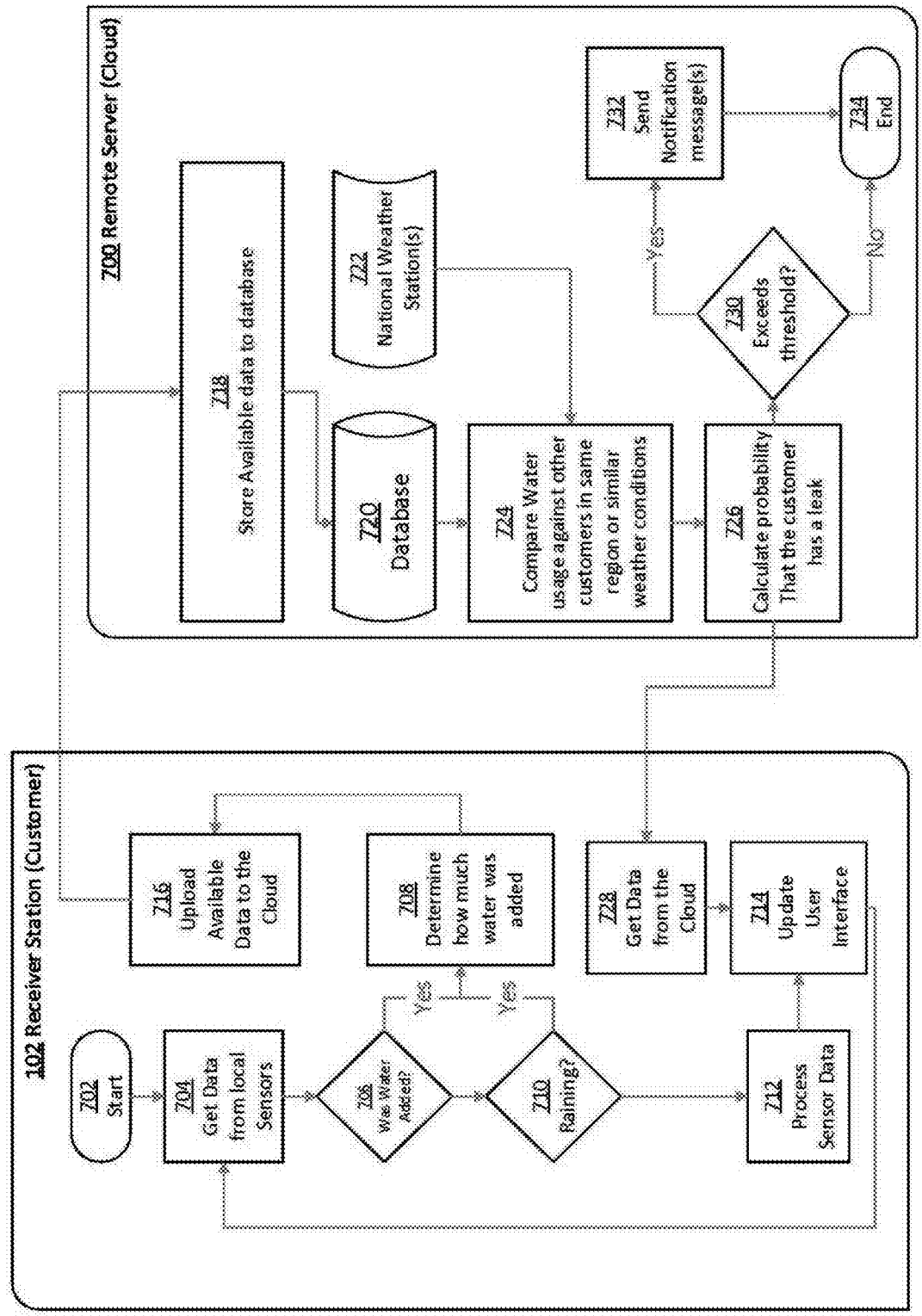
FIG. 7 is a process flow chart representing another exemplary method of monitoring for a water-leak in accordance with the present invention.

Referring now primarily to FIG. 7, a process flow chart for another exemplary process in accordance with the present invention is illustrated, where the early leak-detection device 102 is communicatively coupled to a remote server 700. The process of FIG. 7 starts at step 702 and moves directly to step 704, where the early leak-detection device 102 receives sensor information from one or more sensors 104, 116, 114, 106 communicatively coupled to the early leak-detection device 102 via a wired or wireless communication link 124. The process continues to step 706, where the early leak-detection device 102 queries whether water was added to the reservoir 110. This can be determined by receiving water measurements from the water flow measurement device 106. In step 708, the early leak-detection device 102 continues to monitor how much water is added from the fresh water source 120. In step 710, the early leak-detection device 102 queries whether water is being added through precipitation. This is determined by receiving precipitation measurements from the precipitation sensor 114. In step 712, the early leak-detection device 102 processes the measurements received from the sensors 104, 116, 114, 106. This processing can include determining the measured rate of water loss for the reservoir 110; determining the expected rate of water loss; and comparing the measured rate with the expected rate for determining whether there may be a leak associated with the reservoir 110. In step 714, the early leak-detection device 102 updates the user interface to communicate or indicate the most recent system status to the user.

In step 716, information associated with the amount of water added to the reservoir 110 is communicated to the remote server 700 via a wired or wireless communication link 124. User-input operational parameters, such as the reservoir surface area 122, and sensor information can also be communicated to the remote server 700. User-input operational parameters particular to the user's reservoir 110 can be used to normalize the water usage data for being able to compare water usage information from a plurality of early leak-detection devices 102 that may be associated with differing types of reservoirs 108. In a preferred embodiment, the remote server 700 is operably configured to receive information associated with water loss from the plurality of early leak-detection devices 102 within a particular area. In step 718, the information received from the early leak-detection device 102 is stored within a database 720. The database 720 can be a non-volatile memory or other data storage device communicatively coupled to the remove server 700.

In one embodiment, the remove server 700 is a computer within the cloud. The database 720 can be a central database, storing all water loss, environmental and weather information for all users. Accordingly, the database 720 can include statistical information associated with water loss for a particular area received from the plurality of early leak-detection devices 102 within the area. Advantageously, this can provide a centralized system whereby water loss for a particular area, such as a neighborhood, a county, a city, or a state, can be calculated, monitored, and/or analyzed to provide statistical information that may be useful for water conservation efforts and for determining whether one user is consuming more water than similarly situated-users within the same area, constituting a potential leak condition. In one embodiment, the remote server 700 can include an executable instruction set with instructions for calculating statistical information associated with water loss information for the particular area using information stored in the database 720, which was received from the plurality of early leak-detection devices 102. In other words, if the early leak-detection device 102 determines that there is more water loss than detected by other early leak-detection devices 102 within the area, there is potentially a leak condition.

In another embodiment, each of the plurality of early leak-detection devices 102 can detect one another within a particular proximity relative to each other. Users can be prompted to input their addresses during an initial installation/registration process. Each of early leak-detection devices 102 can communicate with one another and determine which of the devices 102 is within the same neighborhood or area by comparing address information. If the early leak-detection device 102 determines that the water loss is higher than water loss of other homes within the neighborhood or area by a predetermined threshold, the early leak-detection device 102 can determine that a potential leak may exist.

In step 722, the remote server 700 receives statistical information associated with local weather and environmental conditions. In one embodiment, the statistical information is received from local or national weather services. In step 724, the remote server 700 compares water usage against other users within the same region or area, or with similar weather conditions for determining whether the user is adding more water than other similarly-situated users. The greater the difference, the greater the likelihood that the user has a leak. In step 726, the remove server 700 calculates the probability that the user has a leak. In step 728, the early leak-detection device 102 receives said probability information from the remote server 700, which is then updated at the user interface of the early leak-detection device 102, in step 714. The user-interface update can be in the form of an audio signal transmitted through a speaker coupled to the early leak-detection device 102; a visual indicator, such as a flashing light; or a message visible on a display coupled to the device 102. In step 730, the remote server 700 queries whether the probability exceeds a predetermined threshold. If the answer is yes, a notification message is communicated to the user in step 732. The notification message can be an email, a text message to a cellular mobile device, a pre-recorded voice message, and the like. If the answer is no, the process ends at step 734. In a preferred embodiment, as discussed above, the process continuously monitors for a potential leak.

An early leak-detection warning system, method, and apparatus has been disclosed that continuously monitors for potential water leaks associated with a reservoir, such as a pool, a spa, or a fountain. Advantageously, the present invention prevents costly water loss and structural damage associated with water leaks by detecting a potential leak before the leak worsens to the point of visually noticeable operational deviations. The present invention also provides a system for congregating water usage information for all users in a centralized database to provide statistical information useful for water conservation efforts within a particular region.

What is claimed is:

1. An early-leak detection and warning system for swimming pools within an area, comprising:
   a plurality of swimming pools disposed within an area, each of the plurality of swimming pools:
      disposed a separation distance from each of the other ones of the plurality of swimming pools within the area;
      being independent from and not fluidly coupled to one other ones of the plurality of swimming pools within the area; and
      corresponding to a building within the area and having at least one water valve coupled to the building and operable to release and stop water flow from a fresh water source into the corresponding swimming pool; and
   a plurality of early-leak detection devices disposed within the area, each of the plurality of early-leak detection devices corresponding to one of the plurality of swimming pools so as to:
      determine a rate of swimming pool water loss for the corresponding swimming pool based on the water flow that is released into the swimming pool by the at least one water valve;
      determine an expected rate of swimming pool water loss for the corresponding swimming pool based on at least one environmental factor;
      compare said rate of swimming pool water loss with said expected rate of swimming pool water loss;
      if a minimum threshold value of said rate of swimming pool water loss exceeding said expected rate of swimming pool water loss for the corresponding swimming pool is met, said early-leak detection device:
         communicates an indication indicating that a swimming pool leak may exist;
         selects the highest threshold value reached from a plurality of increasing threshold values; and
         communicates an indication indicating a level of likelihood that a swimming pool leak may exist based on said threshold level reached; and
   a remote server:
      communicatively coupled to each of the plurality of early-leak detection devices within the area, wherein the area is at least one of a neighborhood, a county, a city, and a state and wherein each early-leak detection device communicatively coupled to the remote server is configured to detect a leak in a swimming pool not fluidically coupled to any of the other ones of the plurality of swimming pools; and
      operably configured to aggregate, over a network, a measurement of water use during an individual refill session from each of the plurality of early-leak detection devices disposed within the area so as to identify a likelihood that a leak may be present within an individual one of the plurality of swimming pools.

2. The early-leak detection and warning system in accordance with claim 1, wherein said indication of the level of likelihood includes a percentage of likelihood of a swimming pool leak.

3. The early-leak detection and warning system in accordance with claim 1, further comprising:
   a plurality of water flow measurement devices associated with the plurality of swimming pools so as to determine the rate of swimming pool water loss for the corresponding swimming pools by each of the plurality of water flow measurement devices being coupled to the fresh water source of the corresponding one of the plurality of swimming pools and being configured to measure the water flow that is released into the corresponding swimming pool by the corresponding at least one water valve.

4. The early-leak detection and warning system in accordance with claim 1, wherein the at least one environmental factor includes at least one of:
   an evaporation rate of the swimming pool;
   a temperature associated with the swimming pool;
   a humidity associated with the swimming pool;
   a precipitation measurement associated with the swimming pool;
   statistical information associated with water loss for the area;
   statistical information associated with local weather and environmental conditions;
   wind information associated with the swimming pool;
   a temperature-sensitive material associated with the swimming pool;
   a temperature-sensitive color associated with the swimming pool; and
   a location of the swimming pool relative to direct sunlight.

5. The early-leak detection and warning system in accordance with claim 1, wherein the remove server is further operable to further comprising:
   determine if at least one of the plurality of early-leak detection devices is detecting a leak within the corresponding swimming pool by comparing a statistical value of water loss for the at least one of the neighborhood, the county, the city, and the state, as determined by the rates of water loss received by the remote server from each of the plurality of early-leak detection devices within the area, to the corresponding rate of water loss received from the at least one of the plurality of early-leak detection devices.

6. The early-leak detection and warning system in accordance with claim 1, the system further comprising at least one of:
   a temperature sensor communicatively coupled to at least one of the plurality of early-leak detection devices, the temperature sensor operably configured to measure a temperature and communicate information associated with the measured temperature to the at least one of the plurality of early-leak detection devices to calculate the rate of expected swimming pool water loss for a corresponding one of the plurality of swimming pools;
   a precipitation sensor communicatively coupled to at least one of the plurality of early-leak detection devices, the precipitation sensor operably configured to measure a precipitation and communicate information associated with the measured precipitation to the at least one of the plurality of early-leak detection devices to calculate the rate of expected swimming pool water loss for a corresponding one of the plurality of swimming pools; and
   a wind sensor communicatively coupled to at least one of the plurality of early-leak detection device, the wind sensor operably configured to measure a wind speed and communicate information associated with the measured wind speed to the at least one of the plurality of early-leak detection devices to calculate the rate of expected swimming pool water loss for a corresponding one of the plurality of swimming pools.

7. The early-leak detection and warning system in accordance with claim 1, wherein each of the plurality of early-leak detection devices includes:
    a wireless network interface that communicatively couples the corresponding early-leak detection device to the Internet for receiving local weather and environmental information over the Internet as the at least one environmental factor that the expected rate of swimming pool water loss determined by the early-leak detection device is based on for the corresponding one of the plurality of swimming pools.

8. The early-leak detection and warning system in accordance with claim 1, wherein the remote server is further operably configured to:
    receive, from each of the plurality of early-leak detection devices, at least one user-input operational parameter specific to the corresponding one of the plurality of swimming pools so as to normalize the statistical value of swimming pool water loss for the at least one of the neighborhood, the county, the city, and the state.

9. The early-leak detection and warning system in accordance with claim 1, wherein each of the plurality of early-leak detection devices is operably configured to:
    receive user-input address information associated with the building of the corresponding swimming pool so as to determine whether the early-leak detection device is within the same area as other ones of the plurality of early-leak detection devices.

10. The early-leak detection and warning system in accordance with claim 1, wherein the remote server is further operably configured to:
    receive, from each of the plurality of early-leak detection devices, at least one operational parameter specific to the corresponding one of the plurality of swimming pools so as to normalize the statistical value of swimming pool water loss for the at least one of the neighborhood, the county, the city, and the state.

11. The early-leak detection and warning system in accordance with claim 1, wherein each of the plurality of early-leak detection devices is operably configured to:
    receive location information associated with the building of the corresponding swimming pool so as to determine whether the early-leak detection device is within the same area as other ones of the plurality of early-leak detection devices.

12. An early-leak detection and warning method for swimming pools within an area, said method comprises:
    providing a plurality of early-leak detection devices at each of a plurality of swimming pools disposed within an area, each of the plurality of swimming pools disposed a separation distance from each of the other ones of the plurality of swimming pools within the area, being independent from and not fluidly coupled to one other ones of the plurality of swimming pools within the area, and corresponding to a building within the area having at least one water valve coupled to the building and operable to release and stop water flow from a fresh water source into the corresponding swimming pool;
    determining, by each of the plurality of early-leak detection devices, a rate of swimming pool water loss for the corresponding swimming pool based on the water flow that is released into the swimming pool by the at least one water valve;
    determining, by each of the plurality of early-leak detection devices, an expected rate of swimming pool water loss for the corresponding swimming pool based on at least one environmental factor;
    comparing, by each of the plurality of early-leak detection devices, said rate of swimming pool water loss determined with said expected rate of water loss;
    if a minimum threshold value of said rate of swimming pool water loss exceeding said expected rate of swimming pool water loss for the corresponding swimming pool is met:
        communicating, by the corresponding early-leak detection device, an indication indicating that a swimming pool leak may exist in the corresponding swimming pool; and
        selecting, by the corresponding early-leak detection device, the highest threshold value reached from a plurality of increasing threshold values; and
        communicating, by the corresponding early-leak detection device, an indication indicating a level of likelihood that a swimming pool leak may exist in said reservoir based on said threshold level reached; and
    providing a remote server:
        communicatively coupled to each of the plurality of early-leak detection devices within the area, wherein the area is at least one of a neighborhood, a county, a city, and a state and wherein each early-leak detection device communicatively coupled to the remote server is configured to detect a leak in a swimming pool not fluidically coupled to any of the other ones of the plurality of swimming pools; and
        operably configured to aggregate, over a network, a measurement of water use during an individual refill session from each of the plurality of early-leak detection devices disposed within the area so as to determine if at least one of the plurality of early-leak detection devices is detecting a swimming pool leak within the corresponding independent swimming pool by comparing a statistical value of swimming pool water loss for the at least one of the neighborhood, the county, the city, and the state, as determined by the rates of swimming pool water loss received by the remote server from each of the plurality of early-leak detection devices within the area, to the corresponding rate of swimming pool water loss received from at least one of the plurality of early-leak detection devices.

13. The method in accordance with claim 12, wherein said indication of the level of likelihood includes a percentage of likelihood of a swimming pool leak.

14. The method in accordance with claim 12, further comprising:
    determining, by each of the plurality of early-leak detection devices, the rate of swimming pool water loss for the corresponding swimming pool by determining the water flow that is released into the corresponding swimming pool by the corresponding at least one water valve.

15. The method in accordance with claim 12, wherein the at least one environmental factor includes at least one of:
    an evaporation rate of the swimming pool;
    a temperature associated with the swimming pool;
    a humidity associated with the swimming pool;
    a precipitation amount associated with the swimming pool;
    statistical information associated with water usage for the area;
    statistical information associated with local weather and environmental conditions;

wind information associated with the swimming pool;
a temperature-sensitive material associated with the swimming pool;
a temperature-sensitive color associated with the swimming pool; and
a location of the swimming pool relative to direct sunlight.

16. The method in accordance with claim 12, further comprising:
providing a water flow measurement device for each of the plurality of swimming pools within the area so as to determine the rate of swimming pool water loss for the corresponding swimming pool by coupling the water flow measurement device to the fresh water source of the corresponding swimming pool and measuring, by the water flow measurement device, water flow that is released into the corresponding swimming pool by the corresponding at least one water valve.

17. The method in accordance with claim 12, further comprising:
receiving, over the Internet by a network interface of each of the plurality of early-leak detection devices, local weather and environmental conditions to calculate the expected rate of swimming pool water loss for the corresponding swimming pool.

18. The method in accordance with claim 12, further comprising:
receiving, over the Internet by a network interface of each of the plurality of early-leak detection devices, local weather and environmental conditions from a computer hosting an Internet website, the Internet website providing local weather and environmental information.

19. The method in accordance with claim 12, wherein the remote server is further operably configured to:
receive, from each of the plurality of early-leak detection devices, at least one user-input operational parameter specific to the corresponding one of the plurality of swimming pools so as to normalize the statistical value of swimming pool water loss for the at least one of the neighborhood, the county, the city, and the state.

20. The method in accordance with claim 12, wherein each of the plurality of early-leak detection devices is operably configured to:
receive user-input address information associated with the building of the corresponding swimming pool so as to determine whether the early-leak detection device is within the same area as other ones of the plurality of early-leak detection devices.

21. The method in accordance with claim 12, wherein the remote server is further operably configured to:
receive, from each of the plurality of early-leak detection devices, at least one operational parameter specific to the corresponding one of the plurality of swimming pools so as to normalize the statistical value of swimming pool water loss for the at least one of the neighborhood, the county, the city, and the state.

* * * * *